May 25, 1926.                    1,585,888
G. V. BUDLONG ET AL
ARMORED CABLE
Filed Sept. 2, 1920
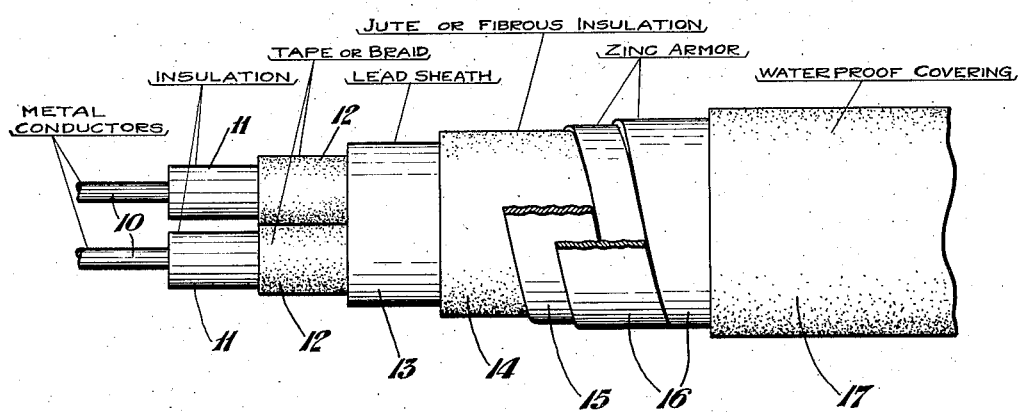
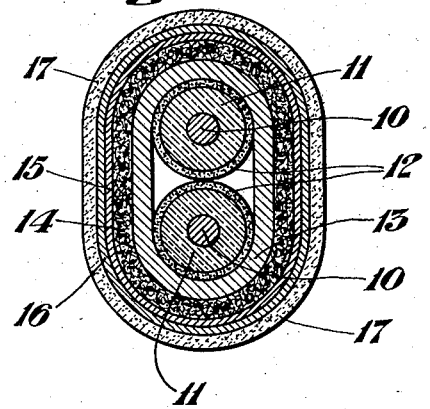
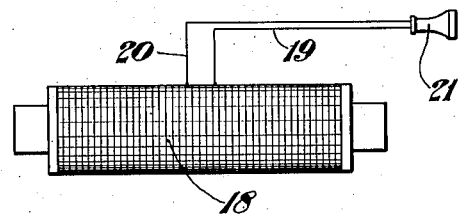
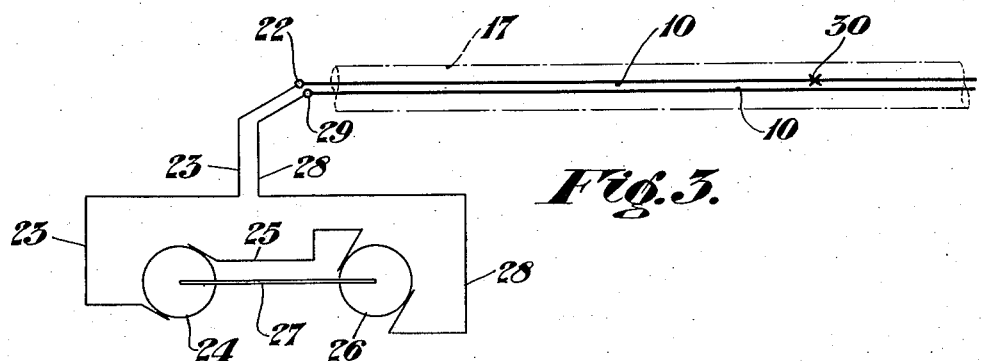
Witnesses:
Edwin Trueb
Inventors:
ALEXANDER O. HOEFTMANN
and GUY V. BUDLONG.
by: D. Anthony Usina
their Attorney.

Patented May 25, 1926.

1,585,888

UNITED STATES PATENT OFFICE.

GUY V. BUDLONG AND ALEXANDER O. HOEFTMANN, OF WORCESTER, MASSACHUSETTS, ASSIGNORS TO THE AMERICAN STEEL AND WIRE COMPANY OF NEW JERSEY, A CORPORATION OF NEW JERSEY.

ARMORED CABLE.

Application filed September 2, 1920. Serial No. 407,750.

This invention relates to the construction of electric cables, and more particularly to the construction of cables requiring a protecting armor, such as underground, aerial, and submarine cables.

One object of our present invention is the construction of cables of the above types having a metallic non-magnetic armor and constructed and arranged to permit the use of an exploring coil in localizing breaks or faults, as they are commonly termed, in the cables.

Another object of the invention is the provision of an armored cable having the novel construction, arrangement, and combination of parts and materials illustrated and described, and specifically pointed out in the appended claim.

Referring now to the drawing, forming part of this specification, in which our invention is shown sufficiently to enable those skilled in the art to understand the construction and operation thereof, Figure 1 is a plan illustrating an armored electric cable embodying our invention.

Figure 2 is an end elevation of the cable shown in Figure 1.

Figure 3 is a diagrammatical plan, hereinafter described.

Figure 4 is a plan of an exploring coil and receiver used in detecting breaks and faults in armored cables.

In the accompanying drawings, the numeral 10 designates the conductors of our improved cable. These conductors 10 may be made of strands instead of single wires, as shown, and the cables may have but a single conductor in lieu of the plurality of conductors shown. The conductors 10 are covered with a layer of insulatory material 11 which in turn is covered with tape or braid 12, and the insulated and taped or braided conductors 10 are enclosed within a lead sheath 13. Obviously, the sheath 13 may contain one or any desired number of conductors 10. The sheath 13 is then provided with a covering 14 formed of jute or similar fibrous non-conducting material.

Surrounding the jute covering 14 is a metallic non-magnetic armor, this armor preferably being formed of two layers of helically wound strips of zinc 15 and 16, the outer layer 16 being staggered with respect to the inner layer 15, so as to overlap the helical joint formed by the abutting edges of the strip 15. The zinc strips 15 and 16 forming the metallic non-magnetic armor is enclosed within an external covering made of any suitable material and made water-proof or fire-proof, or both, in any desired known manner.

With cables made in this manner any breaks or faults in a cable may be easily and quickly localized by the use of a suitable detector, without the necessity of removing the defective cable from the ground, and with a minimum amount of excavation.

In determining the location of a fault or break in a cable, a detector such as is shown in Figures 3 and 4 will be employed, this detector comprising an exploring coil 18 connected by wires 19 and 20 to a telephone receiver 21. (See Figure 4.)

In localizing a fault or break in a cable embodying our invention, a point 22 on one conductor 10 will be connected to one end of a connection 23, and an adjacent point 29 in a second conductor 10 will be connected to a connection 28. The connection 23 is attached by one end to a source of intermittent current 24, this source also being attached to one end of a connection 25. The other end of the connection 25 is attached to a commutator or make and break switch 26, the current source 24 and make and break switch 26 being mounted on a suitable connecting shaft or rod 27. The make and break switch 26 is secured to one end of the connection 28 which has its other end connected at the point 29 to one of the cable conductors 10, as has been described.

From the foregoing it will be readily seen an intermittent current is supplied which passes along the conductors 10 of the cable, and which may be detected by means of the portable exploring coil 18 and receiver 21. In using this detector the operator carries the coil 18 and receiver 21 along the path of the cable, which may be submerged or may be buried in a trench, and which due to its metallic non-magnetic armor, allows the magnetic lines of force to be communicated to the core of the magnetically permeable coil 18. The coil being permeable causes a buzz in the telephone receiver 21 which will continue to sound until the fault, (indicated at 30, Figure 3), is reached. When such fault is reached an interruption in the magnetic lines of force is caused thereby, and buzzing in the receiver stops, and thereby indicates to the operator the location of the fault. The result is not possible with an armor of magnetic material, as the magnetic armor is magnetically permeable, which causes the magnetic lines of force to be retained within said magnetic armor and renders the coil 18 and receiver 21 inoperative in localizing faults or breaks in the cable.

It will be seen that our improved cable construction provides a metallic armored cable, wherein faults may be quickly localized at a minimum expense and without the necessity of removing any part of the cable for examination, as will be readily understood and appreciated by those skilled in the art.

Various changes and modifications in the construction and arrangement of the parts of the cables made according to our invention, may be made without departing from the spirit and scope thereof as defined in the appended claim.

We claim:—

A flexible armored cable comprising a plurality of insulated conductors, a lead sheath mounted around and enclosing said conductors, a fibrous covering for said sheath, a non-magnetic metallic armor surrounding said fibrous covering, said armor comprising inner and outer helically wound zinc strips, said outer strip being staggered with respect to said inner strip so as to overlap the helical joint formed by the abutting edges of said inner strip, and a waterproof covering enclosing said armor.

In witness whereof, I have hereunto signed my name.

GUY V. BUDLONG.

In witness whereof, I have hereunto signed my name.

ALEXANDER O. HOEFTMANN.